United States Patent
Gaubatz et al.

(10) Patent No.: US 9,721,160 B2
(45) Date of Patent: Aug. 1, 2017

(54) MANUALLY-ASSISTED DETECTION OF REDEYE ARTIFACTS

(75) Inventors: Matthew D. Gaubatz, Seattle, WA (US); Stephen L. Laszlo, San Francisco, CA (US); Kunal A. Desai, Menlo Park, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 791 days.

(21) Appl. No.: 13/088,795

(22) Filed: Apr. 18, 2011

(65) Prior Publication Data

US 2012/0263378 A1 Oct. 18, 2012

(51) Int. Cl.
G06K 9/00 (2006.01)
G06K 9/20 (2006.01)
G06T 5/00 (2006.01)

(52) U.S. Cl.
CPC ......... G06K 9/0061 (2013.01); G06K 9/2081 (2013.01); G06T 5/005 (2013.01); *G06T 2207/20101* (2013.01); *G06T 2207/30201* (2013.01); *G06T 2207/30216* (2013.01)

(58) Field of Classification Search
CPC .. G06K 9/40; G06K 9/00; G06K 9/46; G06K 9/34; G06K 9/62; H04N 5/00; H04N 5/14; H04N 5/217; H04N 5/228; H04N 1/40; H04N 9/04; H04N 9/46; G06F 17/00; G06T 5/00; G09G 5/02
USPC ....... 382/167, 162, 203, 282, 283, 274, 117, 382/118, 254, 275, 115, 165, 173; 348/224.1, 225, 576, 577, 578, 579, 580, 348/E09.037; 358/518–523, 531, 527, 358/530

See application file for complete search history.

(56) References Cited

U.S. PATENT DOCUMENTS

| | | | |
|---|---|---|---|
| 5,432,863 A | 7/1995 | Benati et al. | |
| 6,016,354 A * | 1/2000 | Lin et al. | ...................... 382/117 |
| 6,577,751 B2 | 6/2003 | Yamamoto | |
| 6,873,743 B2 | 3/2005 | Steinberg | |
| 6,914,694 B1 | 7/2005 | Ichikawa et al. | |

(Continued)

FOREIGN PATENT DOCUMENTS

| | | |
|---|---|---|
| CN | 101620679 A | 1/2010 |
| WO | 03071484 | 8/2003 |
| WO | 2005022466 | 3/2005 |

OTHER PUBLICATIONS

A. Patti et al., article entitled "Automatic Digital Redeye Reduction," © 1998 IEEE; pp. 55-59.

(Continued)

Primary Examiner — Mekonen Bekele
(74) Attorney, Agent, or Firm — HP Inc. Patent Department (57) ABSTRACT

A machine-implemented method of processing an input image includes receiving user input that manually identifies a location in the input image that corresponds to a potential redeye artifact. A set of detected redeye artifacts in the input image is received. One of the detected redeye artifacts that is closest to the manually identified location is identified. The identified detected redeye artifact is stored in a list of redeye artifacts that are identified with manual assistance if the identified detected redeye artifact is within a threshold distance from the manually identified location.

22 Claims, 7 Drawing Sheets

(56) References Cited

U.S. PATENT DOCUMENTS

| | | | |
|---|---|---|---|
| 7,088,855 B1* | 8/2006 | Vide | G06K 9/0061 382/167 |
| 7,116,820 B2* | 10/2006 | Luo et al. | 382/167 |
| 7,155,058 B2* | 12/2006 | Gaubatz | G06K 9/0061 382/167 |
| 7,317,815 B2 | 1/2008 | Steinberg et al. | |
| 7,397,969 B2 | 7/2008 | Enomoto et al. | |
| 7,415,165 B2* | 8/2008 | Itagaki et al. | 382/282 |
| 7,447,365 B2 | 11/2008 | Ferlitsch | |
| 7,460,707 B2 | 12/2008 | Nishi | |
| 7,548,647 B2 | 6/2009 | Whitman | |
| 7,777,912 B2 | 8/2010 | Caine | |
| 7,830,418 B2 | 11/2010 | Ulichney et al. | |
| 7,920,284 B2 | 4/2011 | Yamada et al. | |
| 8,014,013 B2 | 9/2011 | Owen et al. | |
| 8,045,795 B2* | 10/2011 | Umeda | 382/167 |
| 8,170,332 B2* | 5/2012 | Wang et al. | 382/162 |
| 8,175,341 B2* | 5/2012 | Umeda | G06K 9/0061 358/518 |
| 8,249,321 B2* | 8/2012 | Matsuhira | 382/128 |
| 8,358,838 B2* | 1/2013 | Matsushita et al. | 382/165 |
| 8,373,875 B2 | 2/2013 | Ferlitsch et al. | |
| 8,422,780 B2* | 4/2013 | Ciuc | G06T 5/005 382/103 |
| 2003/0068084 A1* | 4/2003 | Kinjo et al. | 382/164 |
| 2004/0070598 A1* | 4/2004 | Enomoto | G06T 7/0004 715/732 |
| 2005/0232490 A1* | 10/2005 | Itagaki | G06K 9/0061 382/190 |
| 2006/0008169 A1* | 1/2006 | Deer | G06K 9/0061 382/254 |
| 2006/0039690 A1 | 2/2006 | Steinberg et al. | |
| 2006/0204052 A1* | 9/2006 | Yokouchi | G06K 9/0061 382/117 |
| 2006/0280362 A1* | 12/2006 | Umeda | G06K 9/0061 382/167 |
| 2007/0036438 A1* | 2/2007 | Thakur | G06K 9/0061 382/190 |
| 2007/0058882 A1* | 3/2007 | Parlin | G06T 5/008 382/275 |
| 2008/0043121 A1 | 2/2008 | Prilutsky et al. | |
| 2008/0112613 A1 | 5/2008 | Luo et al. | |
| 2009/0244614 A1* | 10/2009 | Matsuhira | 358/1.15 |
| 2009/0324063 A1* | 12/2009 | Murase | G06K 9/0061 382/163 |
| 2010/0054592 A1 | 3/2010 | Nanu et al. | |
| 2011/0001850 A1 | 1/2011 | Gaubatz et al. | |
| 2011/0142337 A1 | 6/2011 | Deonarine et al. | |
| 2012/0243783 A1* | 9/2012 | Zimmer | G06K 9/0061 382/167 |
| 2012/0314247 A1 | 12/2012 | Rogers et al. | |
| 2013/0070263 A1 | 3/2013 | Gaubatz et al. | |

OTHER PUBLICATIONS

M. Gaubatz et al., article entitled "Automatic Red-Eye Detection and Correction," © 2002 IEEE; pp. 804-807.

J. Willamowski et al., article entitled "Probabilistic Automatic Red Eye Detection and Correction," © 2006 IEEE; 4 pgs.

Stoik Imaging, product website available at <<http://www.stoik.com/products/photo/STOIK-Imagic/ >>; © 1994-2010; 2 pgs.

F. Gasparini et al., document entitled "Chapter 1—Automatic Red Eye Removal for Digital Photography," in publication entitled "Single-Sensor Imaging: Methods and Applications for Digital Cameras"; 35 pgs.

Ulichney et al., article entitled "Perceptual-Based Correction of Photo Red-Eye," Aug. 2005; 6 pgs.

L. Zhang et al., article entitled "Automated Red-Eye Detection and Correction in Digital Photographs," Oct. 24-27, 2004; 4 pgs.

H. Luo et al., article entitled "An Efficient Automatic Redeye Detection and Correction Algorithm," 4 pgs.

Xerox Corporation, "Xerox FreeFlow® Print Server", Retrieved from http://www.zahrala.com/FFPS_Brochure_US_single_pgs.pdf, 2007.

Erik Vlietinck, "EFI Fiery System 9 Release 2 RIP", Retrieved from http://printing.it-enquirer.com/media/Fiery-System9.pdf, 2009.

Benjamin D. Zarit, Boaz J. Super, and Francis K.H. Quek, "Comparison of Five Color Models in Skin Pixel Classification", Electrical Engineering and Computer Science, University of Illinois at Chicago, Jun. 2002, pp. 1-6.

Robert Ulichney, Mathew Guabatz, and JM Van Thong, "RedBot—a tool for improving red-eye correction", Abstract, Jan. 2004.

M. Gaubatz, et al; "On the Nearly Scale-Independent Rank Behavior of Image Quality Metrics"; IEEE ICIP 2008.

Renato Keshet, et al., Automatic Photo Enhancement Server (HIPIE 2), pp. 1-6, Feb. 2009.

A.P. Witkin, "Scale-space filtering", Proc. 8th Int. Joint Conf. Art. Intell., 1983, pp. 1019-1022, Karlsruhe, Germany.

Burt, P.J.; "Fast filter transforms for image processing"; Computer Vision, Graphics and Image Processing; 1981; pp. 20-51; vol. 16.

Huitao Luo, Jonathan Yen, and Dan Tretter, "An Efficient Automatic Redeye Detection and Correction Algorithm", Hewlett Packard Labs, pp. 1-4, Aug. 2004.

Michael J. Jones and James M. Rehg "Statistical Color Models with Application to Skin Detection", Cambridge Research Laboratory, pp. 1-23, Nov. 2004.

Jay S. Schildkraut and Robert T. Gray, "A Fully Automatic Redeye Detection and Correction Algorithm", IEEE, Dec. 2002, vol. 1, pp. 1-801-1-803.

S. Mallat, "A Theory for Multiresolution Signal Decomposition: The Wavelet Representation, "IEEE Transactions on Pattern Analysis and Machine Intelligence, 1989.

S. Simske, "Evaluating Compression and/or Resampling Approaches for Counterfeit Image Detection", IEEE ICIP 2008.

The International Search Report and the Written Opinion of the International Searching Authority for International App No. PCT/US2008/072010 dated Jan. 12, 2009, 11 pages.

* cited by examiner

MANUALLY-ASSISTED DETECTION OF REDEYE ARTIFACTS

BACKGROUND

Redeye is the appearance of an unnatural reddish coloration of the pupils of a person appearing in an image captured by a camera with flash illumination. Redeye is caused by light from the flash reflecting off blood vessels in the person's retina and returning to the camera.

A large number of image processing techniques have been proposed to detect and correct redeye in color images. In general, these techniques typically are semi-automatic (e.g., manually-assisted) or automatic. Semi-automatic redeye detection techniques rely on human input. For example, in some semi-automatic redeye reduction systems, a user manually identifies to the system the areas of an image containing redeye before the defects can be corrected. Many automatic redeye reduction systems rely on a preliminary face detection step before redeye areas are detected. A common automatic approach involves detecting faces in an image and, subsequently, detecting eyes within each detected face. After the eyes are located, redeye is identified based on shape, coloration, and brightness of image areas corresponding to the detected eye locations.

There are several products available for correcting redeye in existing images. These products typically operate on electronic, i.e., digital, representations of the images. Some redeye correction software products require a user to first display the image on his or her computer's monitor. In some of these products, the user manipulates a pointing device, such as a mouse, to "paint" over the occurrences of redeye in the displayed image. Correction of redeye using these products is often time-consuming and user-intensive. In addition, the results are often poor, sometimes looking even worse than the original occurrences of redeye. Another potential problem associated with a manually-assisted redeye correction tool is that erroneously entered user data can lead to damaging effects. Thus, it would be desirable to provide a manually-assisted redeye correction system that balances the information input by a user with automatic checks and other processes to promote robustness.

Fully-automatic redeye removal technologies are provided in some photo management systems. In many cases, the fully-automatic algorithms are configured, or trained, using a set of examples of redeye images and non-redeye images. However, in a large scale system, such as one that receives millions of images per day, there can be some images that fall outside the class defined by any training set used to configure the algorithm. In addition, for robustness, an automatic solution would need a face detector capable of locating faces in non-standard poses and at non-standard orientations. Existing face detection solutions, however, do not typically detect all faces in images that contain redeye artifacts due to computational constraints. In some systems, a considerable percent of images that contain faces with redeye artifacts can remain undetected.

For these and other reasons, a need exists for the present invention.

DETAILED DESCRIPTION

In the following detailed description, reference is made to the accompanying drawings which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments of the present invention can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

Manually-assisted redeye correction approaches that are bundled with some photo manipulation software often require user interaction beyond the click of a mouse. Specification of artifact size and/or correct pupil luminance is required in some of these solutions, which increases the complexity of the solutions. Another problem with some solutions is that they may correct any red region that a user specifies as an artifact, and sometimes users do not accurately identify redeye artifact locations. One embodiment provides a robust solution that is configured to mitigate the effects of such user errors, and incorporates a face detector and other higher level processing to prevent correction of non-redeye red regions.

One embodiment is directed to a manually-assisted redeye removal solution that is more effective than previous solutions. First, it solves the problem of providing a much higher correction rate (some previous solutions could only correct about 50% of the presented redeye artifacts given certain input, and embodiments disclosed herein find 90-95%). Second, embodiments disclosed herein provide more robust performance. Some existing manual redeye tools can miss less severe artifacts, and even worse, catastrophically damage images (e.g., by "correcting" entire facial regions). Embodiments disclosed herein not only provide a greatly increased correction rate, but also eliminate the "face-correction" issue. Third, embodiments disclosed herein can correctly handle erroneous user input, and can in some cases undo the damage caused by some existing solutions; because some of the embodiments only use a location of a mouse click to operate, locations previously recorded with an existing tool can be used to invoke the techniques disclosed herein. It is considerably harder to damage images using the techniques disclosed herein. In a test with 163 redeye subjects, only one spurious correction mark was generated in response to all user clicks. Embodiments disclosed herein provide more consistent results whether an image is being edited, previewed, or printed.

When a face-based automatic redeye detection algorithm fails, the failure is generally due to the fact that: (1) the face detection stage did not locate a face with redeye artifacts; or (2) the eye detection stage did not locate any eyes within a face. One embodiment provides a manually-assisted redeye correction system that is capable of correcting both of these issues based on coarsely specified user input.

Figure 1:
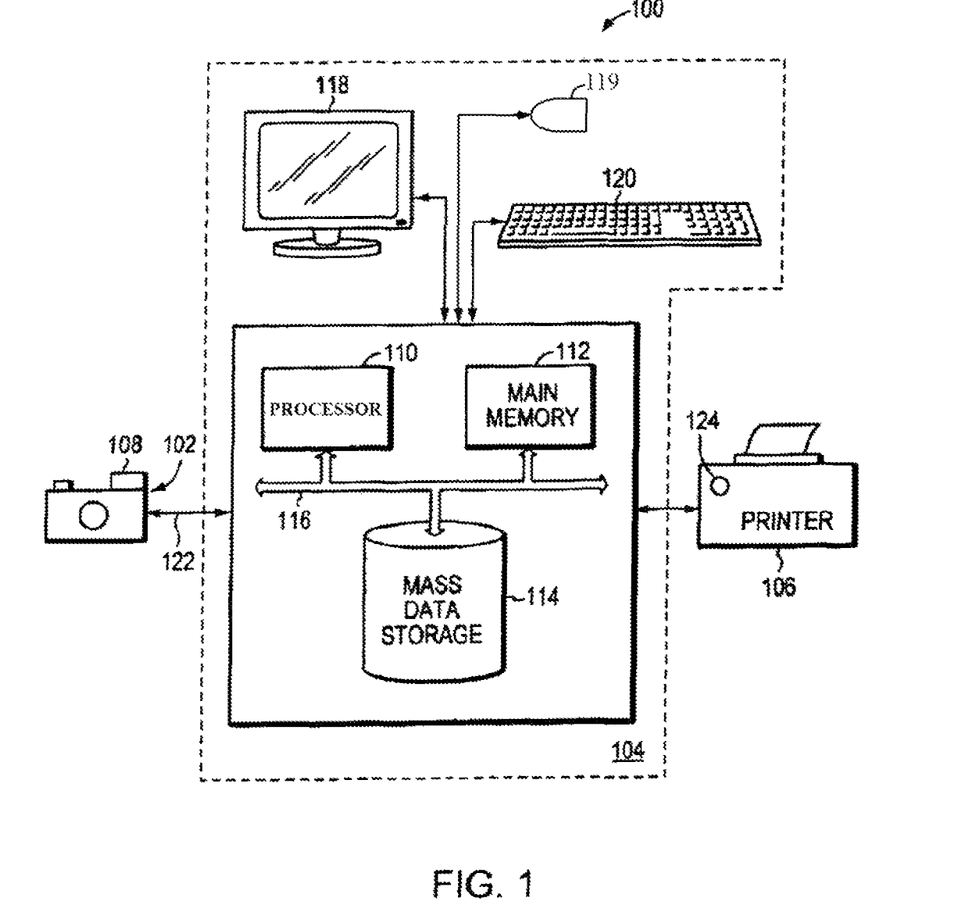
FIG. 1 is a diagram illustrating a computing system suitable for providing manually-assisted redeye correction according to one embodiment.

FIG. 1 is a diagram illustrating a computing system 100 suitable for providing manually-assisted redeye correction according to one embodiment. The computing system 100 preferably includes a digital camera 102 for capturing photographs or images in digital format, a computer platform 104, and a printer 106. The camera 102 includes a built-in flash 108 that can be used in low ambient light conditions. The computer platform 104 preferably includes one or more processors 110, a main memory 112, and a mass data storage unit 114 interconnected by a bus 116. System 100 further includes a display screen 118 and one or more input devices, such as mouse 119 and keyboard 120.

The camera 102 may be detachably coupled to the computer platform 104 as illustrated by arrow 122 so that digital images captured by the camera 102 can be downloaded and stored in the computer platform 104, such as at the mass data storage unit 114. The printer 106 is also coupled to the computer platform 104, e.g., through a parallel port (not shown), so that images stored at the computer platform 104 can be printed. The printer 106, moreover, preferably includes one or more processing elements (not shown) similar to processor 110 as well as one or more memory elements (not shown) similar to main memory 112 and/or mass data storage unit 114.

Those skilled in the art will recognize that there are many ways of transferring digital images captured by camera 102 to computer platform 104, including without limitation storing them on a permanent or reusable medium, such as flash cards, floppy disks, compact disks (CDs), etc. Furthermore, camera 102 could be coupled directly to printer 106 in order to print captured images directly from the camera 102 and/or printer 106 could include a CD and/or flash card drive for receiving images.

Figure 2:
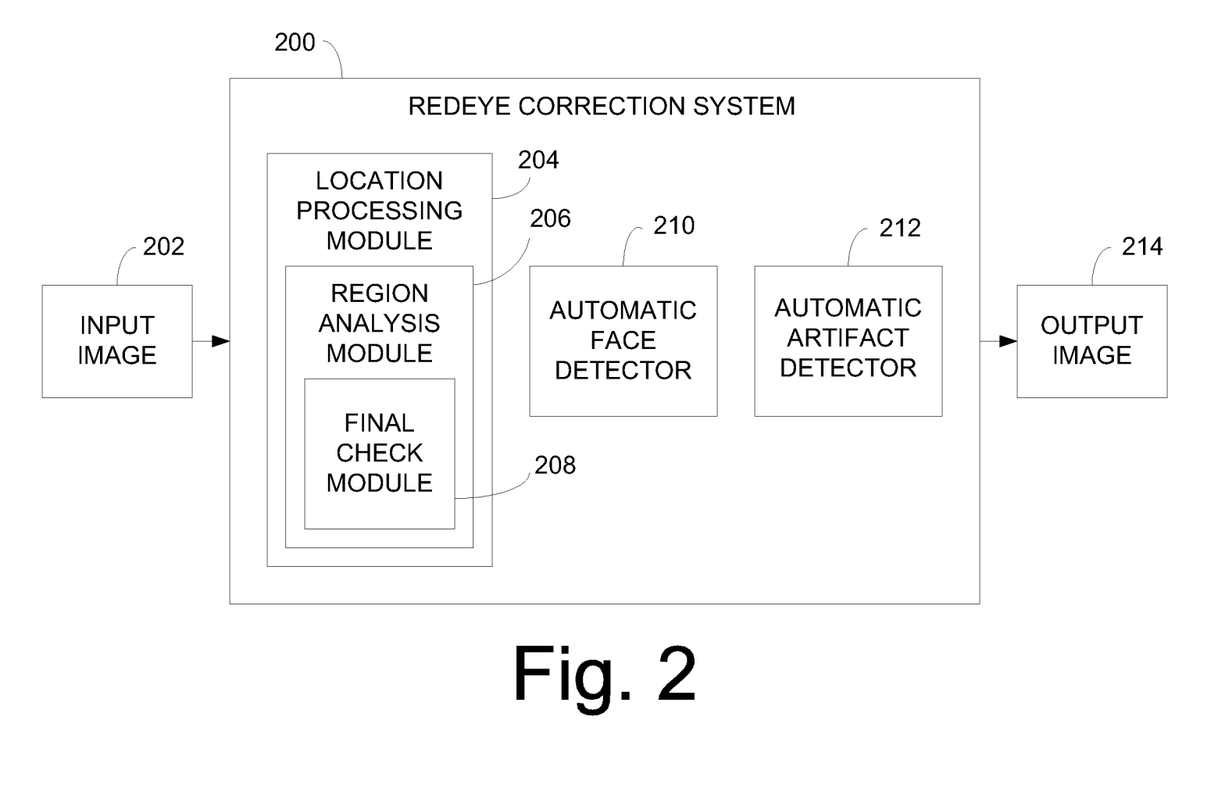
FIG. 2 is a block diagram illustrating a redeye correction system according to one embodiment.

FIG. 2 is a block diagram illustrating a redeye correction system 200 according to one embodiment. System 200 includes location processing module 204, automatic face detector module 210, and automatic artifact detector module 212. Location processing module 204 includes region analysis module 206. Region analysis module 206 includes final check module 208. Modules 204-212 are described in further detail below with reference to FIGS. 3-6.

As described in more detail herein, a digital color input image 202 is received and processed by system 200, which generates a digital color output image 214 whose detected occurrences of redeye have been corrected. In one embodiment, system 200 identifies occurrences of redeye in input image 202 based at least in part on manual user input (e.g., via mouse 119), and corrects any detected occurrences of redeye.

In one embodiment, system 200 is implemented with the computing system 100 shown in FIG. 1. It will be understood by those skilled in the art that system 200 may comprise registers and combinational logic configured and arranged to produce sequential logic circuits. In the illustrated embodiment, system 200 is preferably implemented through one or more software modules or libraries containing program instructions pertaining to the methods described herein that can be stored at the memories 112, 114 of the computer platform 104, and that are executable by processor 110. Other computer readable media may also be used to store and execute these program instructions. Nonetheless, those skilled in the art will recognize that various combinations of software and hardware, including firmware, may be utilized to implement specific embodiments.

The input image 202 and the output image 214 each comprise a plurality of pixels that can be considered, at least logically, to be organized in an array or matrix having a plurality of rows and columns. In other words, each pixel has an x-coordinate, which identifies the particular column within which the pixel is located, and a y-coordinate, which identifies the particular row within which the pixel is located. Thus, each pixel can be identified by its unique x, y coordinates. In addition, each pixel contains digital data which may be in the well-known Red, Green, Blue (RGB) color space. Specifically, each pixel may have eight bits of data in the Red plane (i.e., values 0-255), eight bits of data in the Blue plane (i.e., values 0-255) and eight bits of data in the Green plane (i.e., values 0-255). As described herein, in the output image 214, those pixels from the input image 202 that were identified as corresponding to occurrences of redeye are corrected, while all other pixels from the input image 202 remain unchanged. Suitable file formats for the input and output images 202, 214 include the well-known JPEG, BMP, and GIF file formats, among others.

Figure 3:
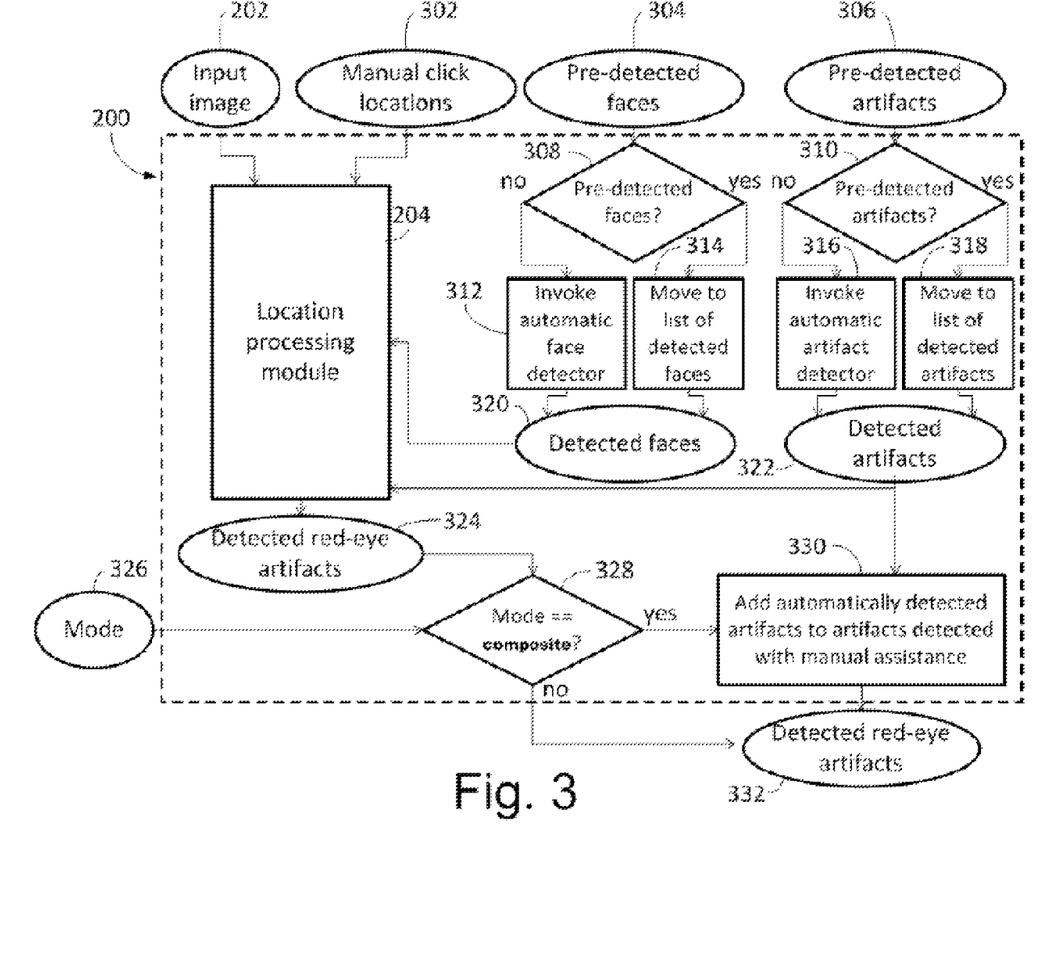
FIG. 3 is a diagram illustrating features of the redeye correction system shown in FIG. 2 according to one embodiment.

FIG. 3 is a diagram illustrating features of the redeye correction system 200 shown in FIG. 2 according to one embodiment, specifically, the components that perform redeye detection. The inputs for system 200 include input image 202, a list of manual mouse click locations 302 indicated by a user, a list of pre-detected faces 304, a list of pre-detected artifacts 306, and a mode input parameter 326. As indicated at 308, system 200 determines whether there are any detected faces in the list of pre-detected faces 304. If it is determined at 308 that there are not any detected faces in the list 304, system 200 invokes automatic face detector 210 (FIG. 2) at 312 to detect faces in input image 202 and store the detected faces in a list of detected faces 320. If it is determined at 308 that there are detected faces in the list 304, system 200 moves the detected faces at 314 and stores the detected faces in the list of detected faces 320.

As indicated at 310, system 200 determines whether there are any detected artifacts in the list of pre-detected artifacts 306. If it is determined at 310 that there are not any detected artifacts in the list 306, system 200 invokes automatic artifact detector 212 (FIG. 2) at 316 to detect artifacts in input image 202 and store the detected artifacts in a list of detected artifacts 322. If it is determined at 310 that there are detected artifacts in the list 306, system 200 moves the detected artifacts at 318 and stores the detected artifacts in the list of detected artifacts 322.

Mode input parameter 326 specifies a mode of operation, which determines whether or not the automatically detected artifacts are recorded and returned with the artifacts that are detected with manual assistance. The location processing module 204 receives as inputs the list of detected faces 320, the list of detected artifacts 322, the list of manually-specified click locations 302, and the input image 202, and returns a list of detected redeye artifacts 324, which are detected with manual assistance. As indicated at 330, if system 200 determines at 328 based on mode input parameter 326 that system 200 is operating in composite mode, system 200 adds the list of automatically detected artifacts 322 to the list of detected redeye artifacts 324, and the combination of artifacts is output as detected redeye artifacts 332. If system 200 determines at 328 based on mode input parameter 326 that system 200 is not operating in composite mode, system 200 outputs detected redeye artifacts 324 as detected redeye artifacts 332 (i.e., without adding artifacts 322).

Figure 4:
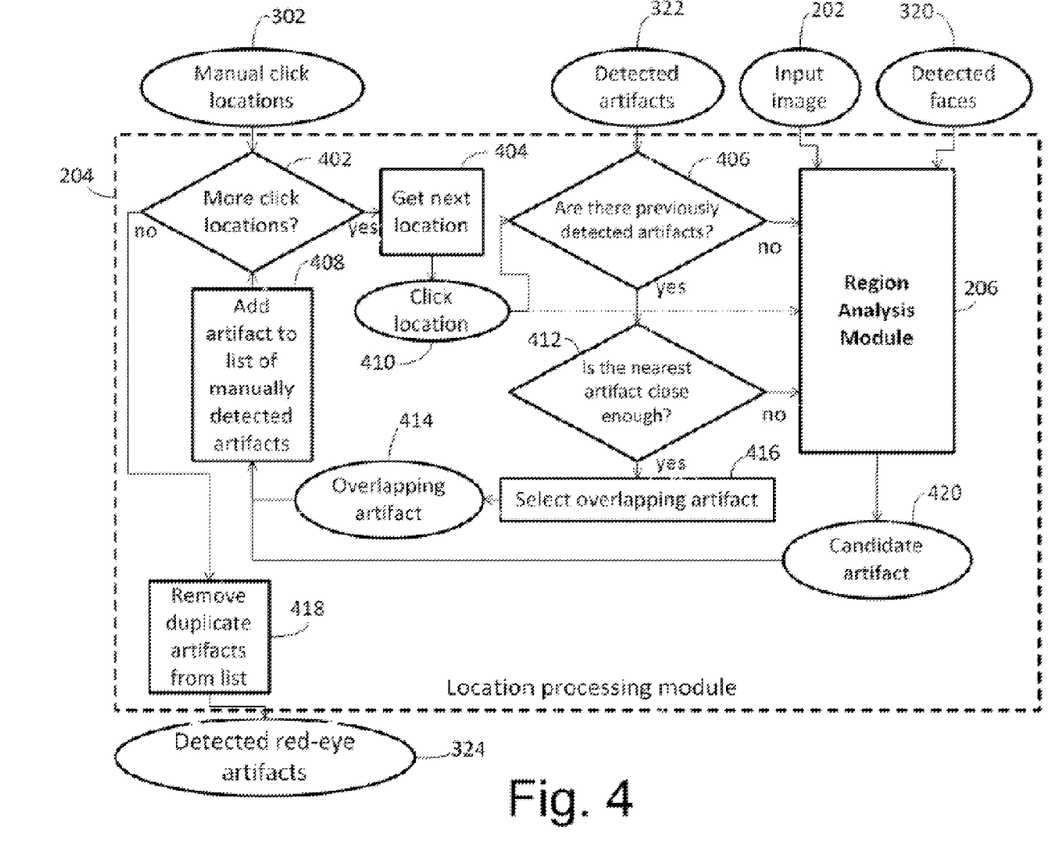
FIG. 4 is a diagram illustrating a location processing module of the redeye correction system shown in FIG. 2 according to one embodiment.

FIG. 4 is a diagram illustrating a location processing module 204 of the redeye correction system 200 shown in FIG. 2 according to one embodiment. The location processing module 204 according to one embodiment processes each location separately. At 402, module 204 determines whether there are any more click locations in the list of manual click locations 302 remaining to be processed. If it is determined at 402 that there are more click locations to be processed, module 204 retrieves at 404 the next click location 410.

Module 204 receives the list of detected artifacts 322, and determines at 406 whether the list 322 includes previously detected artifacts. If it is determined at 406 that the list 322 includes previously detected artifacts, module 204 next determines at 412 if any of the automatically detected artifacts 322 are "close enough" to the click location 410 for the module 204 to assume that the artifact does in fact specify the region associated with the prescribed location. In one embodiment, the detected artifact must overlap the manually-specified location to be considered "close enough" at 412. In one form of this embodiment, the overlapping artifact is selected at 416 and stored as overlapping artifact 414. In another embodiment, the detected artifact must be found within a threshold distance of the manually-specified location. Testing has demonstrated that setting this distance to be a function of the size of the artifact gives strong performance. In one embodiment, this distance (as measured between the center of the artifact and the location) is three times the maximum dimension of the artifact. The overlapping artifact 414 is added to a list of manually detected artifacts at 408, and module 204 again checks at 402 whether there are any more click locations to process. When it is determined at 402 that there are no more click locations remaining to be processed, module 204 removes duplicate artifacts from the list of manually detected artifacts at 418, and outputs a list of detected redeye artifacts 324.

In the cases that there are no previously detected artifacts available, or none of the available artifacts are close enough to the manually-specified location, a local region, inside which a search for additional artifacts will be conducted, is estimated by the region analysis module 206. The region analysis module 206 accepts as inputs the manually specified click location 410, any detected faces 320, and the input image 202, and returns a candidate artifact 420 (if one is found), which is added to the list of manually detected artifacts at 408.

Figure 5:
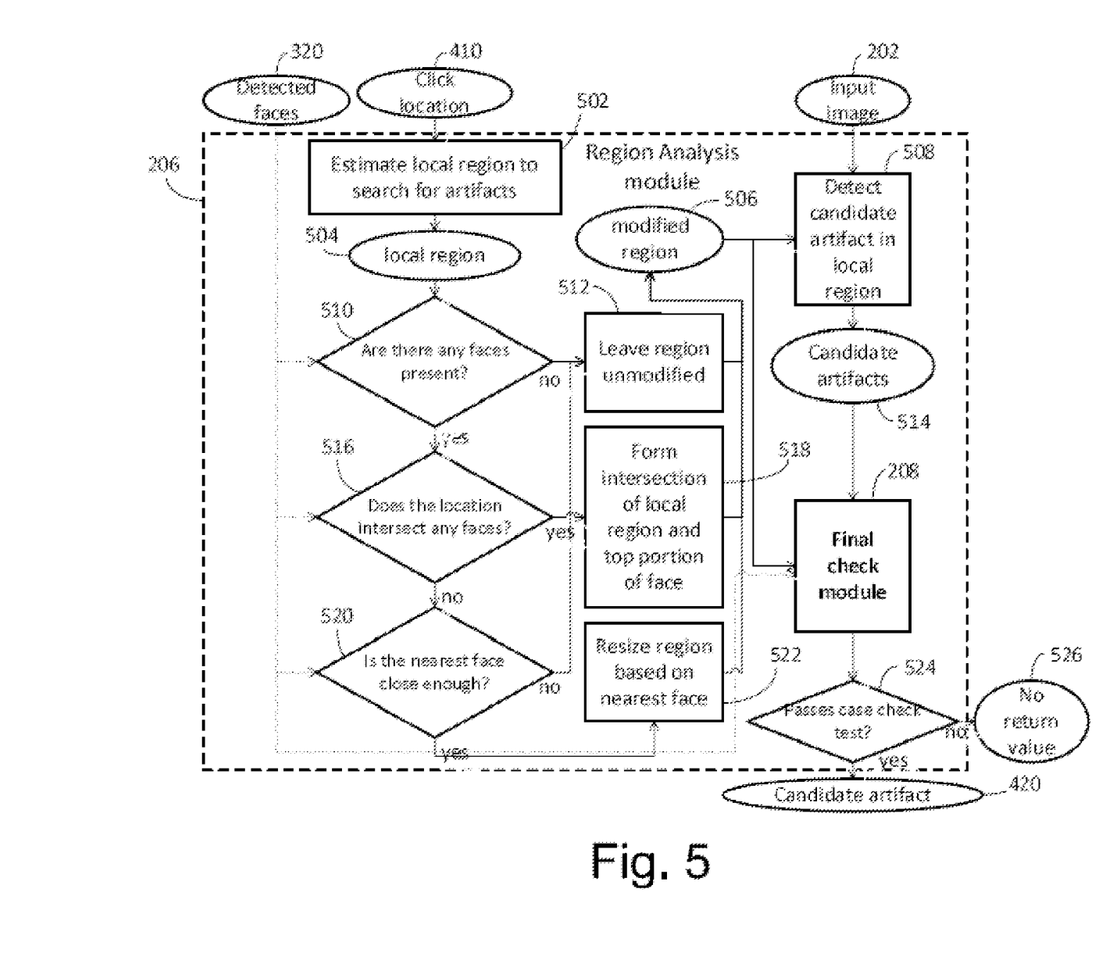
FIG. 5 is a diagram illustrating a region analysis module of the redeye correction system shown in FIG. 2 according to one embodiment.

FIG. 5 is a diagram illustrating a region analysis module 206 of the redeye correction system 200 shown in FIG. 2 according to one embodiment. Module 206 receives as inputs the detected faces 320, mouse click location 410, and the input image 202. At 502, module 206 estimates an initial local search region 504 centered on the current manually-specified location 410, where the size of the local region 504 is a function of the size of the input image 202. In one embodiment, the width and height of the local region 504 are given by some fraction of the sum of the width and height of the input image 202. It has been shown that the fraction $\frac{1}{25}$ yields strong performance. In another embodiment, the width and height of the local region 504 are given by a fraction of the maximum dimension of the input image 202.

In yet another embodiment, the width and height of the local region 504 are given by a fraction of the minimum dimension of the input image 202.

At 510, module 206 determines whether there are any faces present in the local region 504. If it is determined at 510 that there are not any faces present in the local region 504, the local region 504 is not modified, as indicated at 512. If it is determined at 510 that there are one or more faces present in the local region 504, module 206 next determines at 516 whether the click location 410 intersects (i.e., overlaps) any of the faces. If it is determined at 516 that the click location 410 intersects one of the faces, module 206 modifies the local region 504 at 518 to be equal to the intersection of the local region 504 and the top portion of the detected face, and thereby generates a modified region 506. In one embodiment, the top portion of the face is defined by the top half of the face. In another embodiment, the top portion is defined as a region between the top sixth and the top half of the face. In yet another embodiment, the top portion excludes the regions at the outside edges of the face.

If it is determined at 516 that the click location 410 does not intersect any of the faces, module 206 next determines at 520 whether the nearest face is "close enough" to the click location 410. The term "close enough" according to one embodiment means that the local region 504 is within a threshold distance of a detected face. If it is determined at 520 that the nearest face is close enough to the click location 410, the local region 504 is resized at 522 based on properties of the nearest face, thereby generating modified region 506. It has been demonstrated that in many cases, faces that are near each other in an image are of similar sizes, which is why this stage of estimation is reasonable. In one embodiment, the "close enough" distance at 520 is $\frac{1}{8}$th the length of the minimum dimension of the face, that is, whichever of the width or height of the face is smaller. Furthermore, this distance can be calculated between the manually-specified location and a location within the upper middle portion of the face. In one embodiment, the width and height of the region 504 after re-sizing at 522 is $\frac{1}{20}$th of the sum of the width and height of the nearest face. If it is determined at 520 that the nearest face is not close enough to the click location 410, the local region 504 remains unmodified, as indicated at 512.

After the region 506 has been determined, this region 506 is used in conjunction with a redeye detection scheme at 508 to locate any candidate artifacts 514 present in the region 506. In one embodiment, the same automatic artifact detector 212 used prior to invoking the location processing module 204 is used at 508, possibly with differently-configured input options. A motivation for this choice is that it facilitates the re-use of code, such that manually-assisted detection can be achieved largely using existing code designed for an automatic removal application. In one embodiment, the same detector 212 trained on different samples of data is used. Once the list of candidate artifacts 514 has been computed, it is next determined whether or not any of the artifacts in the region 506 can be considered true artifacts, and which artifacts within the region 506 must be corrected. This stage of processing is handled by the final check module 208. At 524, module 206 performs a case check test and then outputs a candidate artifact 420 or provides no return value 526.

Figure 6:
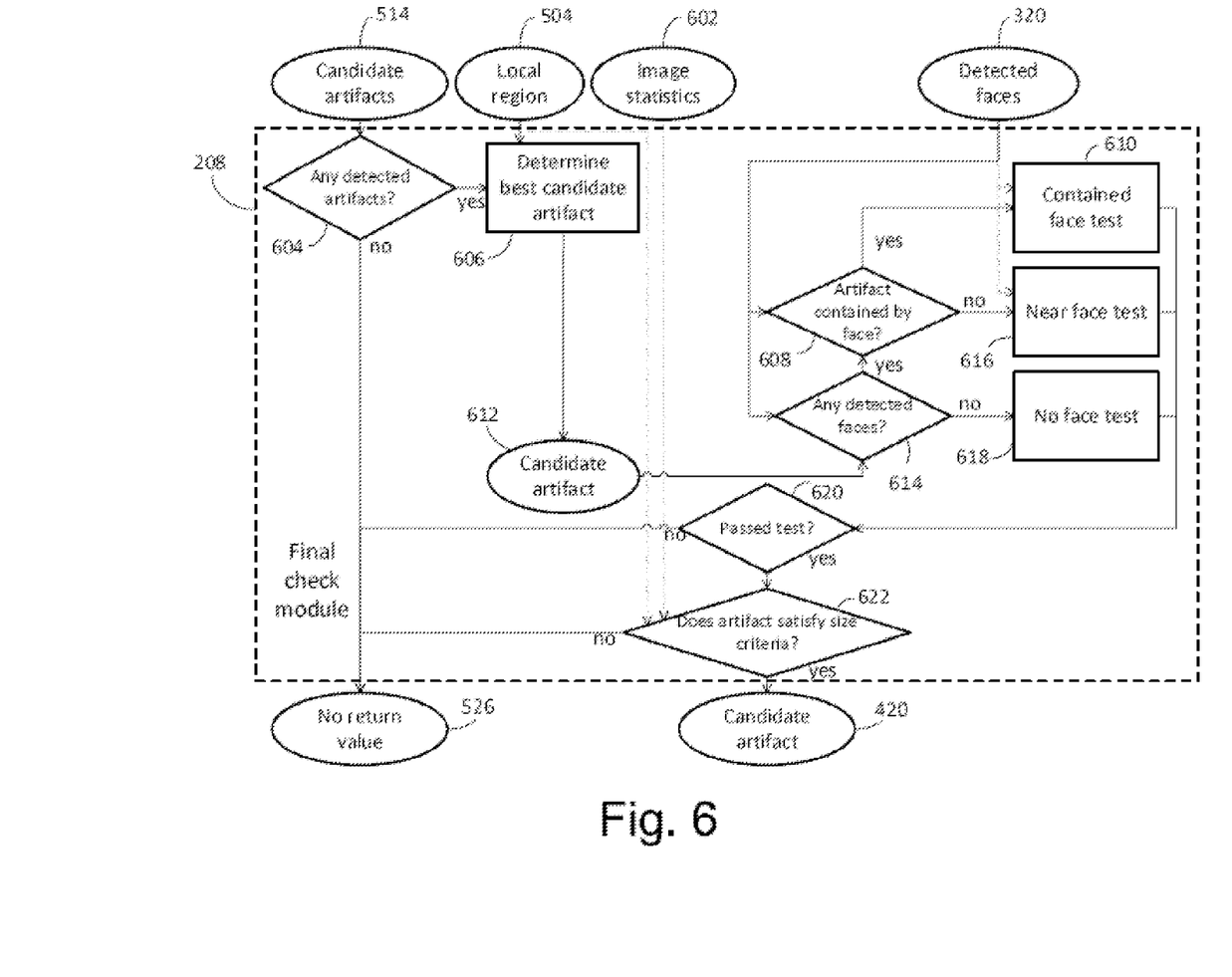
FIG. 6 is a diagram illustrating a final check module of the redeye correction system shown in FIG. 2 according to one embodiment.

FIG. 6 is a diagram illustrating a final check module 208 of the redeye correction system 200 shown in FIG. 2 according to one embodiment. The final check module 208 accepts as inputs the list of candidate artifacts 514, local region 504, image statistics 602, and detected faces 320, and outputs a single detected candidate artifact 420 if any of the artifacts in the list 514 should be corrected. At 604, module 208 determines whether there are any detected artifacts in the list of candidate artifacts 514. If it is determined at 604 that there are not any detected artifacts in the list 514, module 208 provides no return value 526. If it is determined at 604 that there are detected artifacts in the list 514, module 208 determines at 606 a best candidate artifact 612. To determine which candidate artifact, if any, should be considered the best candidate artifact 612, a number of criteria can be used. In one embodiment, whether or not any artifact overlaps the manually-specified location is used. In another embodiment, the artifact closest to the manually-specified location is used. In another embodiment, the artifact associated with the highest probability of being an artifact is chosen. In another embodiment, the artifact with the highest probability is chosen only if the probability associated with the artifact is above a given threshold. In another embodiment, each artifact is compared with properties of the image and detected faces, a score is derived from the properties, and the artifact with the highest score is selected.

Once a candidate artifact 612 has been selected, it is further analyzed to determine whether or not it violates any rules for acceptable artifacts. These tests are put in place for robustness, to account for properties some of which may not have been addressed by the artifact detector 212. There are separate tests to determine how to proceed if there are no detected faces, if there are detected faces but none of them contain the candidate artifact, or if a detected face does contain the detected artifact. Specifically, module 208 determines at 614 whether there are any detected faces and determines at 608 whether the artifact is contained in a detected face. If there is a detected face and the artifact is contained in the detected face, module 208 performs a contained face test at 610. If there is a detected face, but the artifact is not contained by the detected face, module 208 performs a near face test at 616. If there are no detected faces, module 208 performs a no face test at 618. After performing the test 610, 616, or 618, module 208 determines at 620 whether the candidate artifact 612 passed the test. If it is determined at 620 that the artifact 612 did not pass the test, module 208 provides no return value 526. If it is determined at 620 that the artifact 612 passed the test, module 208 next determines at 622 whether the artifact satisfies size criteria. If it is determined at 622 that the artifact does not satisfy the size criteria, module 208 provides no return value 526. If it is determined at 622 that the artifact satisfies the size criteria, module 208 returns the artifact as candidate artifact 420. The three tests 610, 616, and 618, as well as the size criteria test 622, according to one embodiment, are summarized below.

The contained face test 610 rejects the candidate artifact 612: (1) if the nearest detected eye within the face overlaps too little of the candidate artifact; (2) if the candidate artifact overlaps too little of the nearest detected eye within the face; (3) if the candidate overlaps too much of the face; (4) if the candidate is too large compared to the face; (5) if the candidate is too high inside the face; or (6) if the candidate is too low inside the face.

The near face test 616 rejects the candidate artifact 612: (1) if the candidate area is too large compared to the nearest face; (2) if the candidate dimensions are too large compared to the dimensions of the nearest face; or (3) if the candidate is associated with a probability of being a true artifact that is too low.

The no face test 618 rejects a candidate artifact 612: (1) if the candidate area is too large compared to the average area of any other detected artifacts; (2) if the candidate area is too small compared to the average area of any other detected artifacts; (3) if the average dimensions of the candidate are too large compared to the average dimensions of any other detected artifacts; (4) if the average dimensions of the candidate are too small compared to the average dimensions of any other detected artifacts; or (5) if the candidate is associated with a probability of being a true artifact that is too low.

The candidate artifact 612 is rejected at 622 if it is found to be too big in relationship to the region in which it was found. In one embodiment, rejection occurs at 622: (1) if the sum of the image dimensions are greater than sum multiple of the artifact dimensions; (2) if the area of the image is less than some multiple of the area of the artifact; or (3) if the area of the region is less than some multiple of the area of the artifact.

Once all of these tests have been completed, the candidate artifact 420 is returned and is subsequently corrected by system 200.

Figure 7:
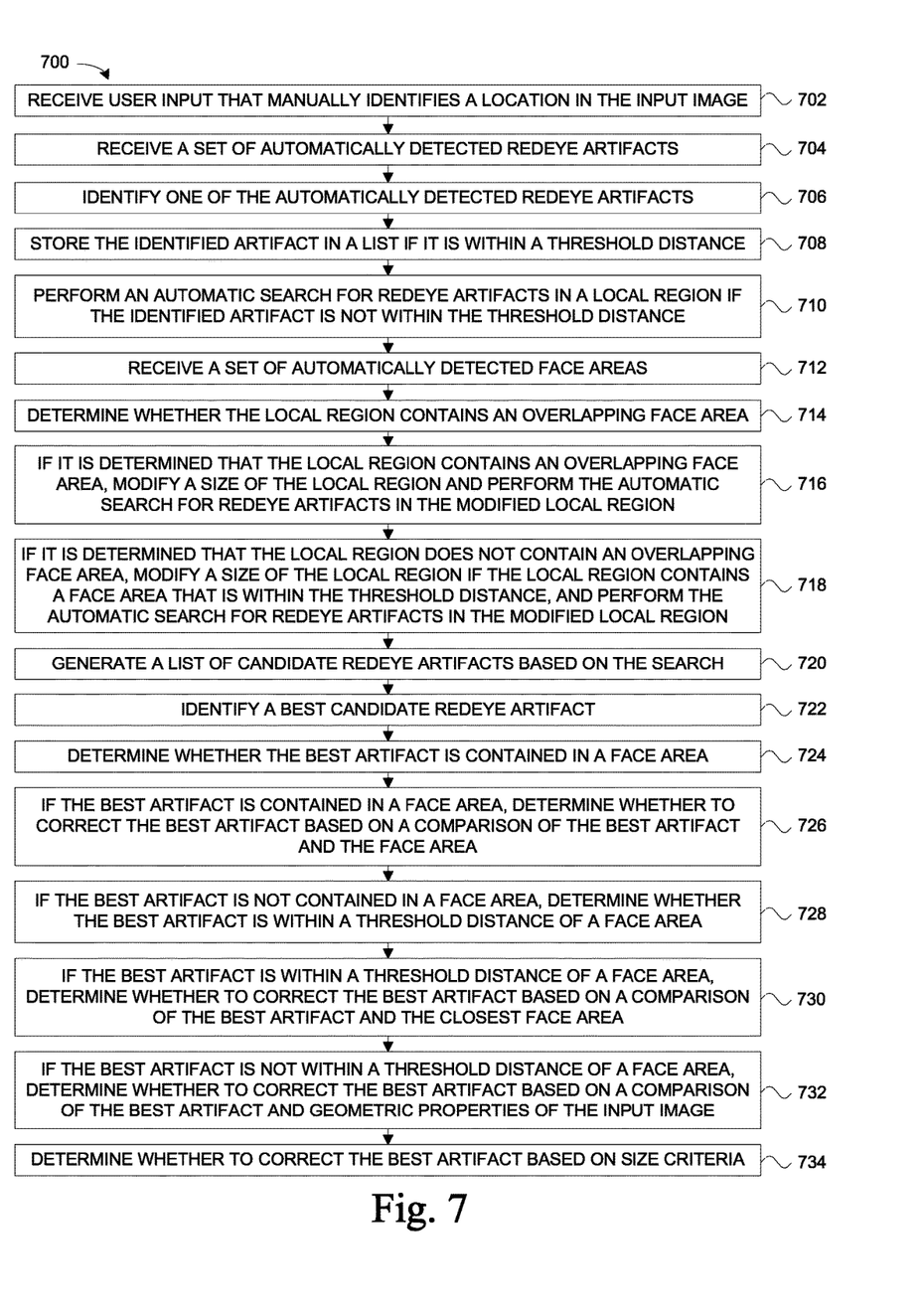
FIG. 7 is a flow diagram illustrating a method for processing an input image according to one embodiment.

FIG. 7 is a flow diagram illustrating a method 700 for processing an input image according to one embodiment. In one embodiment, system 200 (FIG. 2) is configured to perform method 700. At 702 in method 700, user input is received that manually identifies locations in the input image that correspond to potential redeye artifacts. At 704, a set of automatically detected redeye artifacts in the input image is received. The remainder of the steps described in the following are repeated for each manually identified location. At 706, one of the automatically detected redeye artifacts that is closest to the manually identified location is identified. At 708, the identified automatically detected redeye artifact is stored in a list of redeye artifacts that are identified with manual assistance if the identified automatically detected redeye artifact is within a threshold distance from the manually identified location. In one embodiment, the identified automatically detected redeye artifact is within the threshold distance only if the identified automatically detected redeye artifact overlaps the manually identified click location. In another embodiment, the threshold distance at 708 is about three times a maximum dimension of the identified automatically detected redeye artifact.

At 710 in method 700, an automatic search is performed for redeye artifacts in a local region near the manually identified location if the identified automatically detected redeye artifact is not within the threshold distance from the manually identified location. In one embodiment, the local region is centered on the manually identified location and is a fraction of a size of the input image. The local region according to one embodiment has a size that is about $\frac{1}{25}^{th}$ of the size of the input image.

At 712 in method 700, a set of automatically detected face areas in the input image is received. At 714, it is determined whether the local region contains a face area that overlaps the manually identified location. At 716, if it is determined at 714 that the local region contains a face area that overlaps the manually identified location, a size of the local region is modified to correspond to an intersection of the local region and a top portion of the face area that overlaps the manually identified location, and the automatic search for redeye artifacts is performed in the modified local region. At 718, if it is determined at 716 that the local region does not contain a face area that overlaps the manually identified location, it is determined whether the local region contains a face area that is within a threshold distance of the manually identified location, and if it is determined at 718 that the local region contains a face area that is within the threshold distance of the manually identified location, a size of the local region is modified based on properties of the face area within the threshold distance, and the automatic search for redeye artifacts is performed in the modified local region. In one embodiment, the threshold distance at 718 is a fraction of a minimum dimension of the face area. In one embodiment, the size of the local region is modified at 718 to be a fraction of a sum of a width and a height of the face area.

At 720 in method 700, a list of candidate redeye artifacts in the local region is generated based on the automatic search. At 722, a best candidate redeye artifact in the list of candidate redeye artifacts is identified. In one embodiment, the best candidate redeye artifact is identified at 722 at least in part based on proximity to the manually identified location. In one embodiment, the best candidate redeye artifact is identified at 722 at least in part based on a calculated probability of being an actual redeye artifact.

At 724 in method 700, it is determined whether the best candidate redeye artifact is contained in a face area. At 726, if it is determined at 724 that the best candidate redeye artifact is contained in a face area, it is determined whether to correct the best candidate redeye artifact based on a comparison of properties of the best candidate redeye artifact and properties of the face area. At 728, if it is determined at 724 that the best candidate redeye artifact is not contained in a face area, it is determined whether the best candidate redeye artifact is within a threshold distance of a face area. At 730, if it is determined at 728 that the best candidate redeye artifact is within a threshold distance of a face area, it is determined whether to correct the best candidate redeye artifact based on a comparison of properties of the best candidate redeye artifact and properties of a closest face area within the threshold distance. At 732, if it is determined at 728 that the best candidate redeye artifact is not within a threshold distance of a face area, it is determined whether to correct the best candidate redeye artifact based on a comparison of properties of the best candidate redeye artifact and geometric properties of the input image. At 734, it is determined whether to correct the best candidate redeye artifact based on size criteria.

In one embodiment, method 700 further includes automatically detecting a set of redeye artifacts in the input image, and automatically detecting a set of face areas in the input image. Method 700 according to one embodiment further includes adding additional detected redeye artifacts to the list of redeye artifacts that are identified with manual assistance based on whether the user specifies that candidate redeye artifacts other than those near manually identified locations are requested.

Advantages provided by embodiments disclosed herein include: (1) improved redeye detection and correction performance; (2) improved results in settings where user input is not entered carefully; (3) simplification of the identification of redeye regions (e.g., single mouse click) compared to some solutions; (4) reduction in the amount of damage in images introduced due to redeye detection failure and/or errant user input; (5) improvement in the appearance of images previously corrected with an existing solution; and (6) the ability to allow users to fix redeyes missed by automatic solutions.

Embodiments disclosed herein provide dramatic improvements over existing manual redeye removal schemes. In both soft-copy and hard-copy tests, the achievable detection rate almost doubled, and the damage that can be introduced via erroneous user clicks was drastically reduced. The ability to leverage coarsely specified user input helps to compensate for computational constraints on some existing automatic detection solutions, while simultaneously reusing some of the core components of those solutions. The manually-assisted system according to one embodiment provides a more robust solution that results in higher quality user experiences.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein. Therefore, it is intended that this invention be limited only by the claims and the equivalents thereof.

What is claimed is:

1. A machine-implemented method of processing an input image, the method comprising:
   receiving user input that manually identifies a location in the input image that corresponds to a potential redeye artifact;
   receiving a set of detected redeye artifacts in the input image;
   identifying one of the detected redeye artifacts that is closest to the manually identified location;
   storing the identified detected redeye artifact in a list of redeye artifacts that are identified with manual assistance if the identified detected redeye artifact is within a threshold distance from the manually identified location, wherein storing the identified detected redeye artifact includes storing a unique x, y coordinate pair of the identified detected redeye artifact identifying a location of the identified detected redeye artifact within the input image; and
   determining, based on a mode of operation, whether to add a unique x, y coordinate pair identifying a location of an artifact within the input image to the list of redeye artifacts that are identified with manual assistance, wherein the artifact is detected prior to receiving the set of detected redeye artifacts, and wherein the mode input parameter determines whether or not the automatically detected artifacts are recorded and returned with the artifacts that are detected with manual assistance.

2. The method of claim 1, wherein the identified detected redeye artifact is within the threshold distance only if the identified detected redeye artifact overlaps the manually identified click location.

3. The method of claim 1, wherein the threshold distance is about three times a maximum dimension of the identified detected redeye artifact.

4. The method of claim 1, and further comprising:
   performing an automatic search for redeye artifacts in a local region near the manually identified location if the identified detected redeye artifact is not within the threshold distance from the manually identified location.

5. The method of claim 4, wherein the local region is centered on the manually identified location and is a fraction of a size of the input image.

6. The method of claim 5, wherein the local region has a size that is about $1/25^{th}$ of the size of the input image.

7. The method of claim 4, and further comprising:
   receiving a set of detected face areas in the input image; and
   determining whether the local region contains a face area that overlaps the manually identified location.

8. The method of claim 7, and further comprising:
if it is determined that the local region contains a face area that overlaps the manually identified location, modifying a size of the local region to correspond to an intersection of the local region and a top portion of the face area that overlaps the manually identified location, and wherein the automatic search for redeye artifacts is performed in the modified local region.

9. The method of claim 7, and further comprising:
if it is determined that the local region does not contain a face area that overlaps the manually identified location, determining whether the local region contains a face area that is within a threshold distance of the manually identified location;
if it is determined that the local region contains a face area that is within the threshold distance of the manually identified location, modifying a size of the local region based on properties of the face area within the threshold distance, and wherein the automatic search for redeye artifacts is performed in the modified local region.

10. The method of claim 9, wherein the threshold distance is a fraction of a minimum dimension of the face area.

11. The method of claim 9, wherein the size of the local region is modified to be a fraction of a sum of a width and a height of the face area.

12. The method of claim 4, and further comprising:
generating a list of candidate redeye artifacts in the local region based on the automatic search; and
identifying a best candidate redeye artifact in the list of candidate redeye artifacts.

13. The method of claim 12, wherein the best candidate redeye artifact is identified at least in part based on proximity to the manually identified location.

14. The method of claim 12, wherein the best candidate redeye artifact is identified at least in part based on a calculated probability of being an actual redeye artifact.

15. The method of claim 12, and further comprising:
determining whether the best candidate redeye artifact is contained in a face area; and
if the best candidate redeye artifact is contained in a face area, determining whether to correct the best candidate redeye artifact based on a comparison of properties of the best candidate redeye artifact and properties of the face area.

16. The method of claim 15, and further comprising:
if the best candidate redeye artifact is not contained in a face area, determining whether the best candidate redeye artifact is within a threshold distance of a face area; and
if the best candidate redeye artifact is within a threshold distance of a face area, determining whether to correct the best candidate redeye artifact based on a comparison of properties of the best candidate redeye artifact and properties of a closest face area within the threshold distance.

17. The method of claim 16, and further comprising:
if the best candidate redeye artifact is not within a threshold distance of a face area, determining whether to correct the best candidate redeye artifact based on a comparison of properties of the best candidate redeye artifact and geometric properties of the input image.

18. The method of claim 17, and further comprising:
determining whether to correct the best candidate redeye artifact based on size criteria.

19. The method of claim 1, and further comprising:
automatically detecting a set of redeye artifacts in the input image; and automatically detecting a set of face areas in the input image.

20. The method of claim 1, and further comprising:
adding additional detected redeye artifacts to the list of redeye artifacts that are identified with manual assistance based on whether the user specifies that candidate redeye artifacts other than those near manually identified locations are requested.

21. A system for detecting and correcting redeye in an input image with user assistance, the system comprising:
a processor;
a memory resource coupled to the processor and storing instructions executable by the processor to:
receive a set of automatically detected redeye artifacts in the input image, identify one of the automatically detected redeye artifacts that is closest to a manually identified location, and store the identified automatically detected redeye artifact in a list of redeye artifacts that are identified with manual assistance if the identified automatically detected redeye artifact is within a threshold distance from the manually identified location, wherein to store the automatically detected redeye artifact includes to store a unique x, y coordinate pair of the automatically detected redeye artifact identifying a location of the automatically detected redeye artifact within the input image;
perform an automatic search for redeye artifacts in a local region near the manually identified location if the identified automatically detected redeye artifact is not within the threshold distance from the manually identified location, generate a list of candidate redeye artifacts in the local region based on the automatic search, and identify a best candidate redeye artifact in the list of candidate redeye artifacts; and
determine, based on a mode of operation, whether to add a unique x, y coordinate pair identifying a location of an artifact within the input image to the list of redeye artifacts that are identified with manual assistance, wherein the artifact is detected prior to receiving the set of automatically detected redeye artifacts, and wherein the mode input parameter determines whether or not the automatically detected artifacts are recorded and returned with the artifacts that are detected with manual assistance.

22. A machine-implemented method of processing an input image, the method comprising:
receiving a set of automatically detected redeye artifacts in the input image;
identifying automatically detected redeye artifacts that are closest to manually identified locations;
storing the identified automatically detected redeye artifacts in a list of redeye artifacts that are identified with manual assistance if the identified automatically detected redeye artifacts are within threshold distances from the manually identified locations, wherein storing the identified detected redeye artifact includes storing a unique x, y coordinate pair of the identified detected redeye artifact identifying a location of the identified detected redeye artifact within the input image;
performing automatic searches for redeye artifacts in local regions near the manually identified locations if the identified automatically detected redeye artifacts are not within the threshold distances from the manually identified locations;

generating lists of candidate redeye artifacts in the local regions based on the automatic searches;

determining, based on a mode of operation, whether to add a unique x, y coordinate pair identifying a location of an artifact within the input image to the list of redeye artifacts that are identified with manual assistance, wherein the artifact is detected prior to receiving the set of automatically detected redeye artifacts, and wherein the mode input parameter determining whether or not the automatically detected artifacts are recorded and returned with the artifacts that are detected with manual assistance;

identifying best candidate redeye artifacts in the lists of candidate redeye artifacts; and storing the best candidate redeye artifacts in the list of redeye artifacts that are identified with manual assistance.

* * * * *